Jan. 9, 1951   G. B. WATKINS   2,537,804
TRANSPARENT PANEL UNIT
Filed Feb. 8, 1943
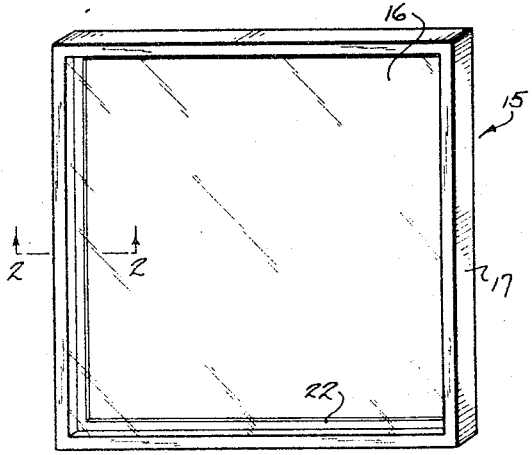
Fig. 1.
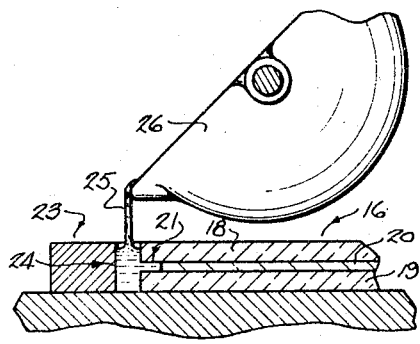
Fig. 3.
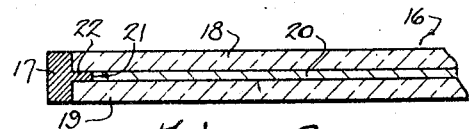
Fig. 2.
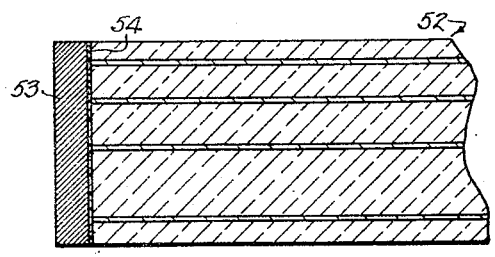
Fig. 9.
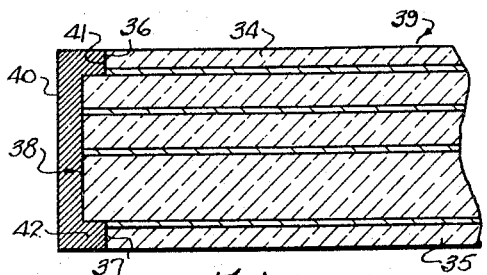
Fig. 6.
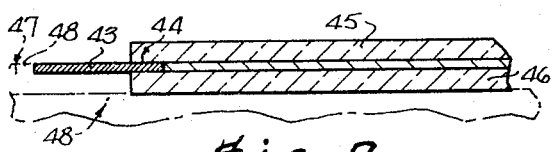
Fig. 7.
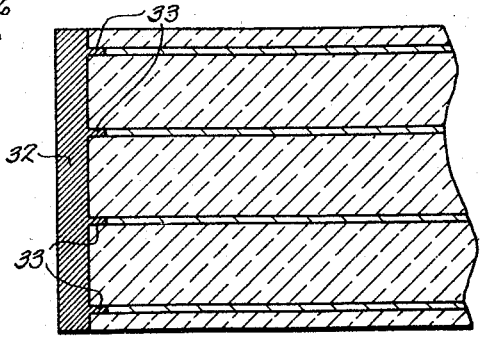
Fig. 5.
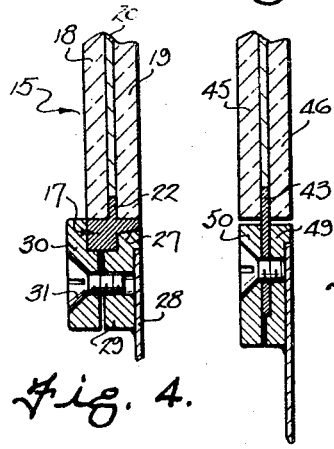
Fig. 4.
Fig. 8.
Inventor
GEORGE B. WATKINS.
By Frank Fraser
Attorney Patented Jan. 9, 1951

2,537,804

UNITED STATES PATENT OFFICE 2,537,804

TRANSPARENT PANEL UNIT

George B. Watkins, Toledo, Ohio, assignor to Libbey-Owens-Ford Glass Company, Toledo, Ohio, a corporation of Ohio Application February 8, 1943, Serial No. 475,112

1 Claim. (Cl. 20—56.5)

The present invention relates to transparent panel units and more particularly to a structure of this character which includes a novel type of mounting frame therefor.

Although not restricted to any specific use, the panel units of this invention have been especially designed for the glazing of sight openings in vehicles of all kinds and particularly combat vehicles, such as airplanes or other aircraft, where the requirements are unusually stringent.

An important object of the invention is the provision of a transparent glass panel unit having a rigid metal mounting frame around the edges of the glass panel, and permanently associated therewith, whereby the entire unit can be clamped into a support without bring the clamping means into direct engagement with the glass.

Another object is to provide a transparent panel unit having a cast metal mounting frame extending entirely around the edges of the panel and provided with extending portions, lying within the margins of the transparent panel, to permanently lock the frame to the panel.

Another object is the provision of a laminated safety glass panel including a plurality of glass and plastic laminations, some of which laminations extend outwardly beyond the others, and a rigid metal frame around the edges of the panel and having portions lying between or overlapping the extended laminations to permanently lock the frame to the panel.

A further object is to provide a rigid metal mounting frame of the above character which can be readily applied around a transparent panel in a manner to produce a unit having a predetermined over-all size, regardless of slight variations in the dimensions of the panel itself, and which can be easily cut or machined.

Still another object is the provision of a method of forming a transparent panel unit of the type set forth above by pouring or casting molten metal around the panel and then permitting the metal to cool and harden to form a rigid frame.

Other objects and advantages of the invention will become more apparent during the course of the following description, when taken in connection with the accompanying drawings.

In the drawings, wherein like numerals are employed to designate like parts throughout the same:

Fig. 1 is a front perspective view of a laminated safety glass panel unit constructed in accordance with the invention;

Fig. 2 is a fragmentary sectional view taken substantially on the line 2—2 of Fig. 1;

Fig. 3 is a fragmentary sectional view showing the method of pouring or casting the metal frame in producing the panel unit of Fig. 1;

Fig. 4 is a fragmentary sectional view of a panel unit similar to that shown in Fig. 1, flush mounted in an airplane sight opening;

Fig. 5 is a fragmentary sectional view of a laminated safety glass panel unit wherein the panel is of the bullet-resistant type and the frame similar to that shown in Fig. 2;

Fig. 6 is a fragmentary sectional view of still another unit involving a different arrangement of bullet resistant glass with a modified form of mounting frame;

Fig. 7 is a fragmentary sectional view of a further modification of my invention showing in broken lines the mold used in its production;

Fig. 8 is a fragmentary sectional view illustrating the manner in which the panel unit of Fig. 7 can be secured within the sight opening of an airplane to give a flush type mounting; and Fig. 9 illustrates another modification including a bullet-resistant panel similar to that shown in Fig. 6 but showing a different way of locking the metal frame to the panel.

Referring now more particularly to the drawings, there has been illustrated in Figs. 1 and 2 a transparent panel unit embodying the invention and designated in its entirety by the numeral 15. The unit comprises a laminated safety glass panel member 16 and a rigid metal frame 17 around the edges of the panel. The panel member 16 is made up of two sheets of glass 18 and 19 and an interposed sheet of thermoplastic material 20 bonded to the inner surfaces of the glass sheets to form a composite structure.

With this particular unit, it is desired to leave a channel 21 between the margins of the glass sheets 18 and 19 and running entirely around the panel 16, in order to receive an extended portion 22 of the frame 17, whereby to lock the frame permanently to the panel member. The channel may be formed by employing a sheet of plastic for the interlayer 20 that is shorter on all sides than the glass sheets 18 and 19 or by undercutting or routing out the plastic 20 to the required depth after the laminated safety glass panel has been composited.

When the panel member 16 has been properly prepared, it is placed in a box-shaped mold 23 which may be of any suitable construction. The inside dimensions of the mold should be the same as that required for the finished panel unit and in this way the proper sized unit will always be obtained regardless of any slight variations in the dimensions of the transparent panel 16. As soon as the panel member 16 has been positioned within the mold so as to leave a uniform space 24 therearound, between the edges of the panel and the sides of the mold, molten metal 25 from a crucible 26 can be poured into the space 24 to cast the frame 17.

There are any number of metallic alloys that can be satisfactorily used as the material from which the frame 17 is formed, but of course there are certain necessary characteristics that such a metal must have. In the first place, its melting point must be sufficiently low to permit it to come in contact with the glass and plastic laminations, while in a molten condition, without having an injurious effect. Second, it should have the capacity to flow readily into engagement with all irregularities in the surfaces which it is to cover. This is important in order to obtain intimate contact of the metal with the glass and to assure its flowing into and filling the channel 21.

Some very satisfactory units have been made using an alloy which can be purchased on the market under the trade-name of "Cerrobase Metal." This material melts between 290° and 300° F., which is entirely satisfactory for the purpose desired since the softening point of the glass sheets are in the neighborhood of 1250° F. and the plastic interlayer (whether a cellulose derivative or a resin) is regularly subjected to temperatures approaching 300° F. in the laminating operation. Another alloy which has the necessary qualifications is ordinary type metal which melts at a relatively low temperature and is especially designed to give "sharp impressions."

It is also desired that the metal used be relatively "soft" so that it will be sufficiently resilient to accommodate itself to any differences between the expansion and contraction coefficients of the metal and the glass. This characteristic is also of advantage in that a "soft" metal can be more easily cut or machined which facilitates fitting and clamping of the unit into its support.

Under some circumstances, particularly when the units are to be used in airplanes or when the size of the units requires that the weight be held to a minimum, it will be better to use a metal that is lighter in weight than "Cerrobase" or type metal and, in fact, an alloy having a low density approaching that of aluminum is preferred.

After sufficient metal has been poured or cast into the space 24 between the edge of the glass and the side of the mold 23 to completely fill the space and also the channel 21, the unit is allowed to stand in the air until the metal cools and hardens to form the rigid mounting frame 17 permanently associated with and locked to the safety glass panel 16 by the extending flange or key 22. Although in Figs. 1 to 3 the frame 17 has been shown as being of plain rectangular shape, it can of course be cast in any desired form by properly shaping the mold 23.

For example, in Fig. 4 there has been illustrated a unit of the type shown in Figs. 1 to 3 mounted in the sight opening of an airplane. It will be noted that the frame 17 has been rabbeted as at 27 to permit the outer surface of the panel 16 to be mounted flush with the outer surface of the skin 28 of the ship. The rabbet 27 can be formed either by casting the frame 17 in a mold of the proper shape or by using the mold of Fig. 3 and subsequently machining or cutting the soft metal to form. In the same way bevels or other shapes could be produced on the frame to facilitate flush or similar type mountings.

By further reference to Fig. 4, it will be noted that the unit 15 can be firmly and securely supported in the sight opening of the plane between a stationary clamping member 29 welded to the skin of the ship and a removable clamping member 30 secured to the stationary member by machine screws 31, without any direct engagement between the clamping members and the glass sheets. In addition, a rigid type of mounting is provided for the transparent panel which mounting acts to positively retain the panel within the opening since any pressure exerted thereon, whether from the inside or the outside of the ship, will be taken by the flange 22 extending inwardly between the glass sheets.

The units shown in Figs. 5 and 6 are similar in construction and are produced in the same manner as described above, the principal difference being that the transparent panels in these later figures are made up of bullet-resisting glass. As a matter of fact, the rigid mounting frame of the instant invention is particularly desirable for use with bullet-resistant glass panels because the additional laminations in this type of structure, together with the added glass thicknesses, results in a unit of considerable weight and rigidity which is not adaptable to the so-called "flexible" type of mounting. When units of this type are mounted in an airplane, there is practically no bending of the bullet-resisting panel which in fact possesses greater rigidity than the skin of the ship. For this reason a rigid frame will give a much more positive and efficient mounting means than will the flexible type.

The frame 32 of Fig. 5 is practically the same as that of Fig. 2 except that four inwardly directed flanges 33 extend into channels between each of the five glass laminations, thus providing additional locking means between the frame and the panel. In Fig. 6, the two outer glass sheets 34 and 35, together with their adjacent plastic interlayers, are cut back as at 36 and 37, while the intermediate glass and plastic laminations extend outwardly as at 38. Thus, when the molten metal is cast around the panel 39 of Fig. 6, a substantially U-shaped frame 40 will be formed between the two arms 41 and 42 of which the extended portion 38 of the panel 39 will be confined. This arrangement is believed to give an even stronger mounting frame than that of Fig. 5 and also one that has a larger amount of available material from which to cut bevels or rabbets to provide flush type mountings.

Fig. 7 illustrates a somewhat different type of unit wherein the frame 43 is in the form of a relatively thin, rigid, metal member fitting into the channel 44 between the glass sheets 45 and 46 and extending outwardly beyond the marginal portions of the sheets to form a metal attaching flange. This particular frame can be produced by using the mold 47 (shown in broken lines in Fig. 7). In this case, the bottom 48 of the mold 47 is parallel with the top surface of the bottom glass sheet 46, while the sides 48 of the mold extend upward only to a point parallel with the bottom surface of the top glass sheet 45. With this arrangement, when the molten metal is cast or poured into the mold 47, a relatively thin metal flange will be formed around the laminated glass panel and which is of the same thickness as the plastic interlayer. Since the molten metal will also flow into the channel 44, the cast frame 43 will be received between the glass sheets and extend outwardly therefrom to form the rigid metal attaching flange described above.

The unit of Fig. 7 is shown in Fig. 8 as being mounted in an airplane sight opening in a manner similar to the way in which the unit of Fig. 2 is mounted in Fig. 4. The rigid mounting frame or attaching flange 43 is securely held between fixed and removable clamping members 49 and 50 respectively by means of machine screws 51 extending through suitable holes formed in the frame 43 itself. As pointed out in connection with the mounting of Fig. 4, this rigid metal mounting frame 43 will give a positive and secure mounting, even when used in pressurized cabins of aircraft.

In Fig. 9 still another modification of the invention, including a bullet-resisting panel 52 similar to that of Fig. 6 is shown. The frame 53 of this unit, however, is different from those discussed before in that it has no portions or flanges extending inwardly of the marginal portions of the laminated glass panel. Instead, in this form, the edge of the bullet-resisting panel is first metallized or coated as at 54 with a suitable material such as copper or a copper alloy. This may be done by spraying or in any other desired manner. After the metal has been deposited on the edge of the glass panel, it should be thoroughly cleaned, by fluxing for example, before the metal frame is cast around the panel. If the metal has been properly cleaned, the hot molten metal coming into contact with the metallic coating 54 on the edge of the glass panel 52 will result in a partial alloy action at the surface of the two metals, thus giving a tight bond. Inasmuch as the metallized coating is of course tightly adherent to the glass edge and since, through the partial alloy action, the frame is bonded to the coating, it will be seen that the three elements are composited into what is in effect an integral structure.

All of the units in the various figures have been described as comprising glass and thermoplastic laminations, but it will be apparent that any other material which would not be adversely affected by the contact of the molten metal could also be used as part or all of the transparent panel. Conversely, any metal or alloy can be used for the frame so long as it does not injuriously affect the materials of the transparent panel during or after its formation around the panel.

Also, instead of a plurality of laminations, it would be possible to utilize a single sheet of glass or other transparent material either by pouring the frame in a manner to embrace the edges of the sheet or by grooving or rabbeting the edges of the single sheet to form channels or offsets similar to those shown in the safety glass units and into which the flanges or key portions of the mounting frame can extend. Of course, the arrangement shown in Fig. 9 will readily accommodate itself to panel units composed of one or any number of sheets or laminations.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

A glazing unit for sight openings, comprising a transparent laminated safety glass panel and a rigid cast metal attaching flange, said transparent panel including a plurality of alternating glass and plastic laminations all bonded together and with at least one of said laminations being shorter than the others, and said cast metal attaching flange being poured around said panel into contact with both glass and plastic laminations and having an attaching portion of less thickness than said panel extending outwardly of the edges of the panel to provide said attaching flange.

GEORGE B. WATKINS.

REFERENCES CITED

The following references are of record in the file of this patent:

UNITED STATES PATENTS

| Number | Name | Date |
| --- | --- | --- |
| 632,908 | Wadsworth | Sept. 12, 1899 |
| 632,909 | Wadsworth | Sept. 12, 1899 |
| 1,224,530 | Goetzke | May 1, 1917 |
| 1,494,103 | DeCardy | May 13, 1924 |
| 1,535,134 | Rockwood | Apr. 28, 1925 |
| 1,929,892 | Kellner | Oct. 10, 1933 |
| 2,050,576 | Kronquest | Aug. 11, 1936 |
| 2,145,930 | Herron | Feb. 7, 1939 |
| 2,300,506 | Kamerer | Nov. 3, 1942 |
| 2,342,758 | Saunders | Feb. 29, 1944 |

FOREIGN PATENTS

| Number | Country | Date |
| --- | --- | --- |
| 30,229 | Germany | Jan. 17, 1885 |
| 495,983 | Great Britain | Nov. 23, 1938 |
| 673,951 | Germany | Mar. 31, 1939 |